US006881793B2

(12) United States Patent
Sheldon et al.

(10) Patent No.: US 6,881,793 B2
(45) Date of Patent: Apr. 19, 2005

(54) POLYPROPLYLENE MATERIALS AND METHOD OF PREPARING POLYPROPYLENE MATERIALS

(75) Inventors: Carolyn Sheldon, Cypress, TX (US); Michael Musgrave, Houston, TX (US); Scott D. Cooper, Humble, TX (US)

(73) Assignee: Fina Technology, Inc., Houston, TX (US)

( * ) Notice: Subject to any disclaimer, the term of this patent is extended or adjusted under 35 U.S.C. 154(b) by 0 days.

(21) Appl. No.: 10/195,997

(22) Filed: Jul. 16, 2002

(65) Prior Publication Data

US 2004/0013870 A1 Jan. 22, 2004

(51) Int. Cl.$^7$ .............................. C08L 23/00; C08F 8/00
(52) U.S. Cl. ...................... 525/240; 525/191; 428/343
(58) Field of Search ................................ 525/240, 191; 428/343

(56) References Cited

U.S. PATENT DOCUMENTS

| | | | |
|---|---|---|---|
| 4,473,687 A | * | 9/1984 | Dorrer et al. ............... 525/240 |
| 5,045,598 A | | 9/1991 | Duez et al. |
| 5,912,292 A | | 6/1999 | Sun |
| 6,153,703 A | * | 11/2000 | Lustiger et al. ............. 525/240 |
| 6,284,833 B1 | * | 9/2001 | Ford et al. .................. 524/515 |
| 6,342,565 B1 | * | 1/2002 | Cheng et al. ............... 525/191 |

OTHER PUBLICATIONS

S.J. Mahajan, B.L. Deopura and Yimin Wang, Structure and Properties of Drawn Tapes of High–Density Polyethylene/Ethylene–Propylene Copolymer Blends, Journal of Applied Polymer Science, vol. 60, 1996, pp. 1527–1538.

* cited by examiner

*Primary Examiner*—Daniel Zirker
(74) *Attorney, Agent, or Firm*—Madan, Mossman & Sriram P.C.

(57) ABSTRACT

A polypropylene material is prepared from a blend of heterophasic propylene copolymers and propylene homopolymers. The material is prepared by blending the polymers while they are in a molten state, and forming a film or sheet from the polymer blend. The material has particular application to forming slit film tapes and similar materials. The resultant materials exhibit increased tenacity, elongation and toughness and greater surface roughness as compared to those materials prepared solely from propylene homopolymers.

23 Claims, 4 Drawing Sheets

50% ICP:iPP Slit Tape Surface
(Z-Range = 801.6nm; Ra -35.3nm; Rms = 49.6nm)

X 20.00 μm/div
Z 1000.000 nm/div

Homopolymer iPP Slit Tape Surface
(Z-Range = 357.7nm; Ra =23.5nm; Rms = 30.0nm)

X 20.00 μm/div

ICP:iPP blend Tape Tenacity

ICP:iPP blend Tape Elongation

ICP:iPP blend Tape Modulus

ICP:iPP blend Tape Toughness

POLYPROPLYLENE MATERIALS AND METHOD OF PREPARING POLYPROPYLENE MATERIALS

TECHNICAL FIELD

The invention relates generally to materials prepared from polyolefins, and more particularly, to films and similar materials prepared from polypropylene, and still more particularly to films and similar materials prepared from a blend of propylene homopolymers and propylene copolymers.

BACKGROUND

Polypropylene is used in a variety of materials. In particular, polypropylene has been found useful in forming films and similar materials having a small or reduced thickness. One such material includes slit film tapes, which are used for a variety of applications. Common applications for polypropylene slit film tapes include carpet backing; industrial-type bags, sacks, or wraps; ropes or cordage; artificial grass and geotextiles. They are particularly useful in woven materials or fabrics that require a high degree of durability and toughness. It is beneficial that slit film tapes process easily and are resistant to breakage during all phases of the life of the tape, including manufacturing, weaving, and in the final fabric. Manufacturing of polypropylene slit film tapes is an extrusion process well known in the art, and inferior processability and strength can result in reduced extrusion efficiencies. Slit film tapes that break during weaving result in reduced loom efficiencies as well as a higher level of fabric defects.

Polypropylene slit film tapes are typically prepared from semi-crystalline, propylene homopolymers. These homopolymers are usually isotactic polymers prepared from stereospecific catalysts, such as Ziegler-Natta catalysts, which are well known in the art. Such polymers have provided polypropylene tapes with good properties in the past, however, improvements are needed.

SUMMARY

A polypropylene material of a film or sheet is formed from a blend of a heterophasic propylene copolymer and an isotactic propylene homopolymer. In specific embodiments the propylene copolymer is present in an amount of from about 5% or more, and may have an ethylene content of from about 5% to about 20% by weight of copolymer. Further, the heterophasic propylene copolymer may have an ethylene-propylene rubber phase in the amount of from about 5% to about 50% by weight of copolymer.

In one particular embodiment the film or sheet is a length of tape that may be drawn to a draw ratio of from about 3:1 to about 10:1, and may exhibit a tenacity at maximum load of at least 5 g/den at a draw ratio of 7.5:1. The length of tape may further have an elongation at maximum load of at least 15% at a draw ratio of 7.5:1, and a tenacity at maximum load at a draw ratio of 7.5:1 that is at least 10% greater than tape prepared solely from isotactic polypropylene under similar conditions.

In still another embodiment, a polypropylene slit film tape is formed from a blend of an heterophasic propylene copolymer and an isotactic propylene homopolymer. In specific embodiments the propylene copolymer used in forming the slit film tape may be present in an amount of from about 5% to about 90% by weight of polymer, and may have an ethylene content of from about 5% to about 20% by weight of copolymer. Further, the heterophasic propylene copolymer may have an ethylene-propylene rubber phase in the amount of from about 5% or more by weight of copolymer.

The length of tape may be drawn to a draw ratio of from about 3:1 to about 10:1, and may exhibit a tenacity at maximum load of at least 5 g/den at a draw ratio of 7.5:1. The length of tape may further have an elongation at maximum load of at least 15% at a draw ratio of 7.5:1.

A method of forming a polypropylene material is also provided. The method includes providing a heterophasic propylene copolymer and an isotactic propylene homopolymer, which are blended together while the polymers are in a molten state. The blend of polymers is then extruded into a sheet or layer of film.

In such method, the propylene heterophasic copolymer may be present in an amount of from about 5% to about 90% by weight of polymer, and may have an ethylene content of from about 5% to about 20% by weight of copolymer. The heterophasic propylene copolymer may also have an ethylene-propylene rubber phase in the amount of from about 5% to about 50% by weight of copolymer.

In specific embodiments of the method, the sheet or layer of film is oriented in one direction. The method may further include forming at least one length of tape from the sheet or layer of film. The length of tape may be drawn to a draw ratio of from about 3:1 to about 10:1, and may exhibit a tenacity at maximum load of at least 5 g/den at a draw ratio of 7.5:1. The length of tape may further have an elongation at maximum load of at least 15% at a draw ratio of 7.5:1, and a tenacity at maximum load at a draw ratio of 7.5:1 that is at least 10% greater than tape prepared solely from isotactic polypropylene under similar conditions. The length of tape may also have a toughness of greater than 5 in-lbf.

A polypropylene article is also provided that includes a plurality of polypropylene slit film tapes that are interlaced or woven together and wherein the slit film tapes are each formed from a blend of a heterophasic propylene copolymer and an isotactic propylene homopolymer. The copolymer and homopolymer may be blended together in a molten state, extruded and formed into a length of tape. The polypropylene article may include a textile material, such as carpet backing.

BRIEF DESCRIPTION OF THE DRAWINGS

For a more complete understanding of the present invention, and the advantages thereof, reference is now made to the following descriptions taken in conjunction with the accompanying figures, in which.

DETAILED DESCRIPTION

Figure 1:
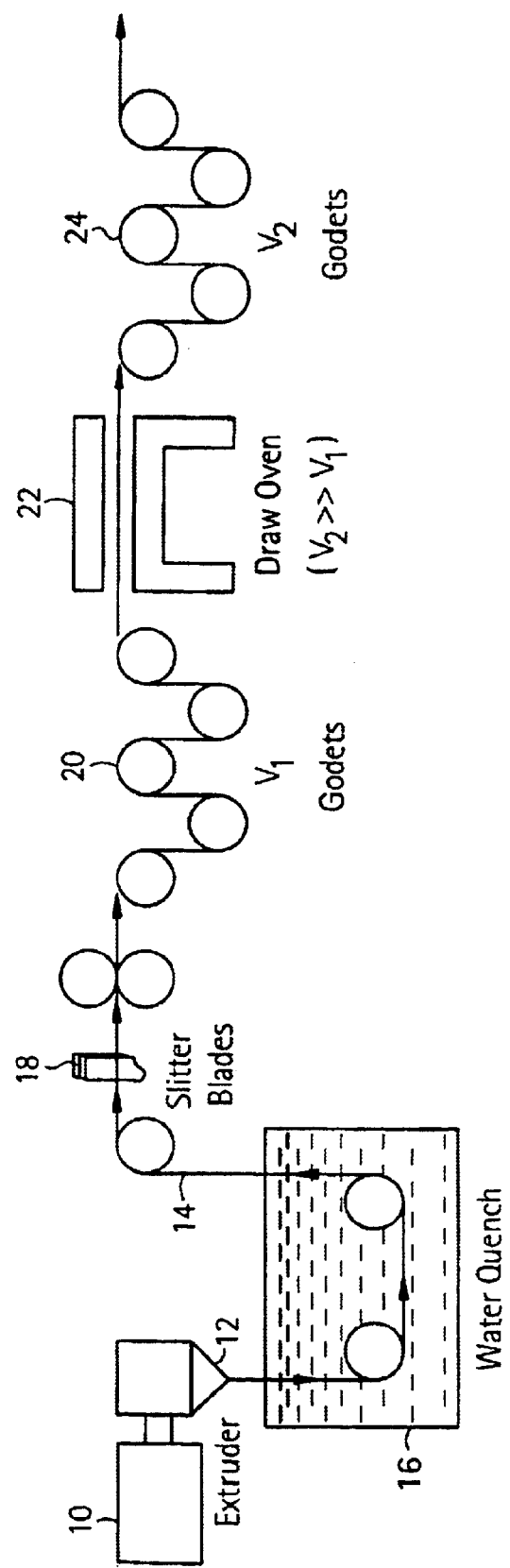
FIG. 1 is a schematic diagram of a slit film tape line.

Propylene impact copolymers (ICP) are typically used in various molded articles, such as those formed through injection molding, requiring high impact strength. These polymers, although particularly well suited for such molded articles, have not been widely used in the manufacture of films or sheet-like material. It has been found, however, that by combining such impact copolymers as a blend with a polypropylene homopolymer, improvements in such materials can be achieved, particularly with respect to slit film tapes.

The ICP polymers used in the present invention are heterophasic copolymers of propylene and ethylene. These polymers are typically made up of three components. These include a semi-crystalline polypropylene homopolymer, a rubbery propylene rich ethylene-propylene copolymer and a semi-crystalline polyethylene polymer. The typical heterophasic morphology of the ICP consists of generally spherical domains of rubbery ethylene-propylene copolymer dispersed within the semi-crystalline propylene homopolymer matrix. The amount and properties of the components are controlled by the process conditions and the physical properties of the resulting material are correlated to the nature and amount of the three components. The ICP polymers may have a room temperature notched IZOD impact strength of from about 2 to about 6 ft-lb$_f$/in, as measured by ASTM D-256. Unless otherwise specified, all notched IZOD impact strength is measured according to ASTM D-256.

The polymerization reaction used to produce such impact copolymers is often carried out in a two-reactor configuration in which a catalyst and propylene are introduced into a first reactor in which the propylene homopolymer is produced. The propylene homopolymer is then transferred to one or more secondary reactors where ethylene monomer is added to produce the ethylene-propylene rubber component of the polymer.

The polypropylene heterophasic copolymers may be those prepared by copolymerizing propylene with ethylene in the amounts of from about 80 to about 95% by weight of propylene and from about 5 to about 20% by weight ethylene. Examples of catalysts used to produce these copolymers may include Ziegler-Natta and metallocene catalysts commonly employed in the polymerization of polypropylene. The polypropylene copolymer may be prepared using a controlled morphology catalyst that produces ethylene-propylene copolymer spherical domains dispersed in a semi-crystalline polypropylene matrix. In the present invention, the amount of ethylene in the ICP may be from about 7 to about 15% by weight. Typical melt flow rates (MFR) for the heterophasic copolymer resins used are from about 2 g/10 min to about 8 g/10 min. Unless otherwise stated all melt flow rates presented are measured according to ASTM D-1238, Condition L. An example of a suitable commercially available heterophasic copolymer is that marketed as ATOFINA 4320, available from ATOFINA Petrochemicals, Inc., Houston, Tex.

Although not necessarily required, the resultant polypropylene heterophasic copolymer fluff or powder can be modified to improve the copolymer's impact strength characteristics and other properties. This can be done through the use of elastomeric modifiers, or with peroxides, using controlled rheology techniques. When using elastomeric modifiers, the elastomeric modifiers are melt blended with the polypropylene copolymer, which facilitates improvements in the energy-absorption behavior of the ICP, contributing to a higher impact strength. Examples of elastomeric modifiers include ethylene propylene rubber (EPR) and ethylene propylene diene monomer (EPDM).

Controlled rheology techniques, commonly known in the art, are used to modify the EPR morphology to enhance impact strength. This technique uses peroxides or other suitable oxidizing agents.

Additionally, other additives, such as stabilizers, antioxidants, nucleating additives, acid neutralizers, antistatic agents, lubricants, filler materials, etc., which are well known to those skilled in the art, may also be combined with the propylene copolymer within the extruder.

The heterophasic propylene copolymer used in the present invention will typically have an ethylene-propylene rubber or EPR phase of from about 5% by or more by weight of copolymer. A EPR content range may be from about 5% to about 50% by weight of copolymer, with from about 7% to about 20% by weight or copolymer being typical, and from about 10% to about 15% by weight of copolymer being more typical.

The propylene homopolymer used for the present invention is an isotactic polypropylene. The polypropylene may be prepared from conventional stereospecific catalysts used for preparing semi-crystalline isotactic polymers, such as Ziegler-Natta or metallocene catalysts. The polypropylene may also contain small amounts of non-isotactic polypropylene, for example syndiotactic or atactic polypropylene, which may be present in amounts of typically less than about 2% or 1% by weight of polypropylene. The homopolymer will typically have a melt flow rate of from about 2 g/10 min to about 8 g/10 min. The polypropylene homopolymer may include small amounts of comonomer, such as the $C_2$ to $C_8$ olefins. Such comonomer content may make up less than 1% by weight of the polymer, less than 0.5% by weight of the polymer, or less than 0.1% by weight of polymer. An example of a suitable commercially available propylene homopolymer is that marketed as ATOFINA 3365, available from ATOFINA Petrochemicals, Inc., Houston, Tex.

In preparing the materials of the invention, both the propylene homopolymer and propylene impact copolymer can be blended together in a molten state. The amount of impact copolymer used with the homopolymer may be from about 5% to about 90% by total weight of polymer. The copolymer may be used in an amount of less than 80% by total weight of polymer, or may be less than 70% by total weight of polymer, with the propylene homopolymer making up greater than 20% or 30% by total weight of polymer, respectively. The propylene impact copolymer content may include ranges of from about 20% to about 80% by total weight of polymer, or from about 30% to about 70% by total weight of polymer. The impact copolymer can also be used in an amount of from about 40% to about 60% by total weight of polymer. The propylene homopolymer and copolymer may be mixed together in pelletized, fluff or powder form prior to being introduced into an extruder. In certain instances, the polymers may be dry blended together prior to being introduced into the extruder. Alternatively, the polymers may be introduced separately into the extruder at a position to achieve thorough mixing of the polymers within the extruder, such as with a gravimetric or volumetric blender, which are commonly known in the art. The melt flow rate of the resulting polymer will typically be from about 2 g/10 min to about 8 g/10 min, with from 3 g/10 min to about 5 g/10 min being more typical.

Additives or processing aids may be combined with the polymers as well during this extrusion process. Typical additives for films and sheet-like materials, such as slit film tapes, which are well known to those skilled in the art, include UV stabilizers, antioxidants, antistatic agents, stearates, calcium carbonate, coloring additives, fluoropolymers and polyethylene.

Although the polypropylene material may be used in forming different film or sheet-like materials having a generally small or reduced thickness, the polymers have particular application to slit film tapes. Accordingly, the following description is with reference to such tapes. It should be apparent to those skilled in the art, however, that the invention is not limited to such tapes, but would apply to the same or similar materials where similar properties are desired.

Referring to FIG. 1, which schematically illustrates one example of a slit film line, the polymers, as well as any additives, are melt blended within an extruder 10 and passed through a die 12 to form a layer of film 14. Alternatively, the blended polymer may be formed into pellets for use at a later time. For slit film tape applications the film die will typically have a die opening of from about 10 to 30 mils to form a film of similar thickness. Upon extrusion through the die, the film is typically quenched in a water bath 16 (typically about 70 to 100° F.) or otherwise cooled, such as by the use of cooling rollers (not shown).

After quenching, the film is slit longitudinally into one or more tape segments or slit film tapes. This is usually accomplished through the use of a slitter 18 consisting of a plurality of blades spaced laterally apart at generally equal distances. The tapes are typically slit into widths of from about 0.25 to about 2 inches, more usually from about 0.5 to about 1 inches, but may vary depending upon the application for which the tapes will be used.

The slit film tapes are then drawn or stretched in the machine or longitudinal direction. This is usually accomplished through the use of rollers or godets 20, 24 set at different rotational speeds to provide a desired draw ratio. A draw oven 22 for heating of the slit film tape to facilitate this drawing step may be provided. For slit film tapes, draw ratios are usually from about 3:1 to about 10:1, with from about 5:1 to about 7:1 being more typical. Drawing of the slit film tapes orients the polymer molecules and increases the tensile strength of the tapes. The final thickness of the drawn tapes is typically from 0.5 mils to 5 mils, with from 1 to 3 mils being more typical. The width of the drawn tapes is typically from about 0.025 inches to about 0.70 inches, with from about 0.05 inches to about 0.4 inches being more typical.

After the tapes are drawn, they may be annealed in an annealing oven or on annealing godets (not shown). Annealing reduces internal stresses caused by drawing or stretching of the tape. This annealing reduces tape shrinkage. The tapes are then wound onto bobbins.

Tapes may be individually extruded as well in a direct extrusion process. In such a process, instead of slitting a plurality of tapes from a film, a plurality of individual tapes are extruded through multiple die openings.

The polypropylene tapes produced in accordance with the present invention exhibit better drawability and other physical properties than those prepared from conventional propylene homopolymers. Those tapes prepared with blends of propylene homopolymers and impact copolymers exhibit a greater tenacity and better elongation than conventional polypropylene tapes. Specifically, the tapes of the invention generally exhibit a tenacity at maximum load that is at least 5 g/den at a draw ratio of 7.5:1 and an elongation at maximum of at least 15% at the same draw ratio. The tapes further exhibit a toughness of greater than 5 in-lbf at most draw ratios and blends, with a toughness of greater than 8 in-lbf being readily obtainable in most instances.

Compared to tapes prepared solely from the isotactic polypropylene homopolymer, tapes prepared from the polymer blends exhibited tenacities at a draw ratio of 7.5:1 that was at least 10% greater than the homopolymer tapes prepared under similar conditions. Further, these tapes exhibited elongation at maximum at a draw ratio of 7.5:1 that was at least 10% greater than the homopolymer tapes prepared under similar conditions.

Figure 2:
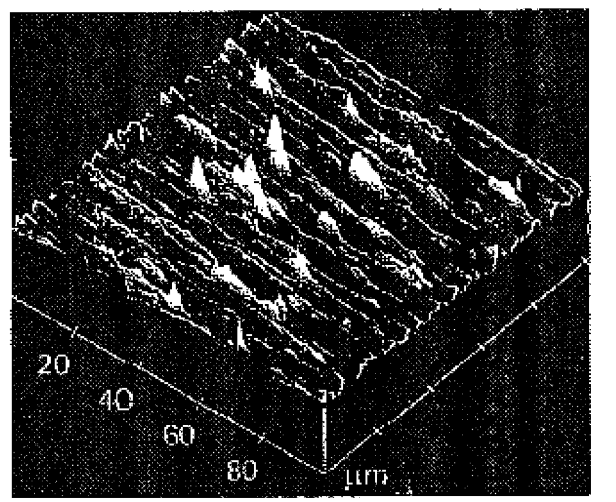
FIG. 2 is a three-dimensional topographic AFM image of a slit film tape surface formed from an ICP:iPP blend.
Figure 3:
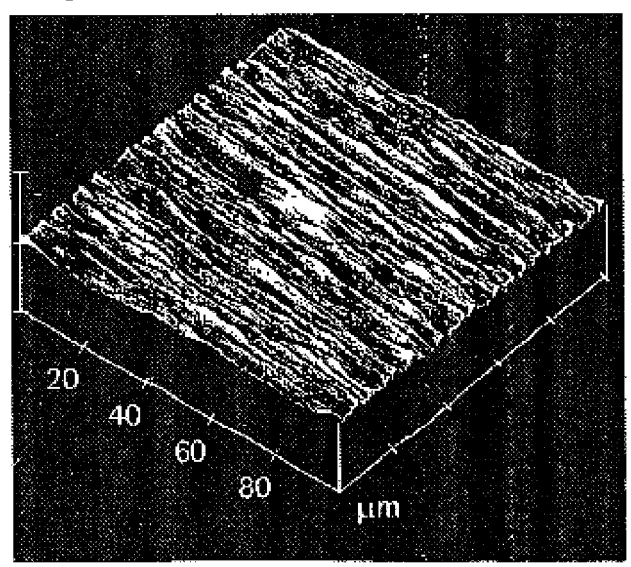
FIG. 3 is three-dimensional topographic AFM image of a slit film tape surface formed from iPP homopolymer.

The tapes also exhibit a unique matte appearance in contrast to isotactic polypropylene homopolymers, which appear shiny or glossy, thus the need for mechanical delustering may be eliminated. When compared to the same isotactic homopolymers used in the blends without ICP, prepared under the same or similar conditions without delustering, as much as 50, 60, 70, 80, 90, 100% or greater increases in surface roughness can be achieved, as determined by Rms and/or Ra values, using atomic force microscopy (AFM) measurements, As used herein, Rms is the root mean square average of height deviation and Ra is average roughness as determined by tapping mode Nanoscope AFM measurements. FIGS. 2 and 3 show the difference in the three-dimensional surfaces of two tape samples prepared from an ICP:iPP blend and an iPP homopolymer, respectively. The films or sheets of the present invention can exhibit a surface Rms that is at least about 50% greater than that of the isotactic propylene homopolymer prepared under the same conditions.

The following examples serve to further illustrate the invention.

EXAMPLE 1

Polypropylene resins prepared from Ziegler-Natta catalysts were used in the evaluations. Specifically, ATOFINA 3365 was used as the polypropylene homopolymer and ATOFINA 4320 was used as the impact copolymer, which had a room temperature (23° C.) notched IZOD impact strength of approximately 4.2 ft-lb/in. The polymers further had the following properties, as set forth in Table 1 below. Different blend formulations were used as set forth in Table 2, using the iPP homopolymer as a control. A Bouligny slit film tape line was used in the study, with typical process parameters being set forth in Table 3.

TABLE 1

| | Resin Characteristics | | |
|---|---|---|---|
| Resin | MFR (g/10 min) | Overall* Wt. % $C_2=$ | EPR* phase Wt. % $C_2=$ |
| iPP | 3.8 | 0 | N/A |
| ICP | 3.7 | 9.5 | 44.7 |

*$C_2$ content as measured by carbon NMR.

TABLE 2

ICP:iPP Blend Formulations (wt. %)

| Formulation: | 1 (control) | 2 | 3 | 4 | 5 |
|---|---|---|---|---|---|
| iPP | 100 | 75 | 50 | 25 | 0 |
| ICP | 0 | 25 | 50 | 75 | 100 |

TABLE 3

Line Settings

| Tape Line Settings | |
|---|---|
| Denier | 1000 |
| Barrel profile (F) | 390–482 |
| Die (F) | 482 |
| Die Gap (mil) | 15 |
| Air Gap (in) | 1 |
| Water Bath (F) | 80 |
| Take Away Speed (fpm) | 100 |
| RS1A, RS1B (fpm)/(F) | 110/ambient |
| Oven (F) | 390 |
| Draw Ratio | 5, 6, 6.6, 7.5, 8, 8.5 |
| Annealing (F) | 320 |
| Relaxation (%) | 15 |

Table 4 and FIGS. 4 through 7 set forth the physical properties of tapes prepared from Formulations 1–5 for the ICP:iPP blends that were evaluated.

TABLE 4

| Formulation | Draw Ratio-denier | Elong @ max (%) | 5% Modulus (g/den) | Ten@ max (g/den) | Toughness (in-lb$_f$) | Tape Tension (g) | Tape Breaks |
|---|---|---|---|---|---|---|---|
| 1 | 5:1-1020 | 42.9 | 22.1 | 5.7 | 18.1 | 500 | 0 |
| 1 | 6.6:1-993 | 22.7 | 35.2 | 6.5 | 9.9 | 1400 | 4 |
| 1 | 7.5:1-993 | 13.1 | 41.5 | 5.1 | 4.2 | 1900 | 20 |
| 2 | 5:1-1012 | 38.6 | 22.5 | 5.2 | 14.9 | 450 | 0 |
| 2 | 6.6:1-1003 | 27.9 | 32.8 | 6.7 | 12.3 | 1250 | 0 |
| 2 | 7.5:1-1017 | 18.9 | 38.3 | 6.3 | 8.5 | 1800 | 7 |
| 3 | 5:1-1011 | 42.9 | 18.5 | 4.7 | 14.9 | 425 | 0 |
| 3 | 6.6:1-1013 | 29.5 | 30.9 | 6.5 | 13.1 | 1150 | 2 |
| 3 | 7.5:1-999 | 27.2 | 37.3 | 7.4 | 13 | 1700 | 6 |
| 3 | 8.5:1-1009 | 18.3 | 43.6 | 6.7 | 8.4 | 2000 | 7 |
| 3 | 8:1-1030 | 24.2 | 38.6 | 7.3 | 11.5 | 2000+ | 12 |
| 4 | 5:1-1007 | 47.9 | 16.2 | 4.4 | 15.9 | 350 | 0 |
| 4 | 6.6:1-1025 | 29.9 | 26.8 | 6 | 12.4 | 1050 | 1 |
| 4 | 7.5:1-1027 | 27.9 | 32.7 | 6.8 | 12.7 | 1550 | 1 |
| 4 | 8.5:1-1022 | 20 | 41.1 | 6.7 | 8.6 | 1850 | 4 |
| 4 | 8:1-1011 | 24.1 | 37.3 | 6.9 | 10.7 | 2000+ | 10 |
| 5 | 5:1-1027 | 42.6 | 16.1 | 4 | 12.8 | 300 | 0 |
| 5 | 6.6:1-1015 | 27.5 | 27.1 | 5.5 | 9.9 | 900 | 0 |
| 5 | 7.5:1-1024 | 26.6 | 31.3 | 6.2 | 11.1 | 1400 | 0 |
| 5 | 8.5:1-1008 | 22.8 | 39.2 | 6.7 | 9.8 | 1800 | 0 |
| 5 | 8:1-1011 | 25.5 | 33.1 | 6.5 | 10.9 | 2000 | 3 |

Tenacity, elongation, tensile moduli and toughness of the slit film tapes was measured with an Instron Model 1122 (retrofitted to a model 5500) in a constant rate tensile loading mode using a 50 lbf load cell and pneumatic clamping cord and yarn grips. The gauge length was set at 5 inches and the rate of deformation was 5 in/min. Tape tension was measured with a hand held tensiometer.

Figure 4:
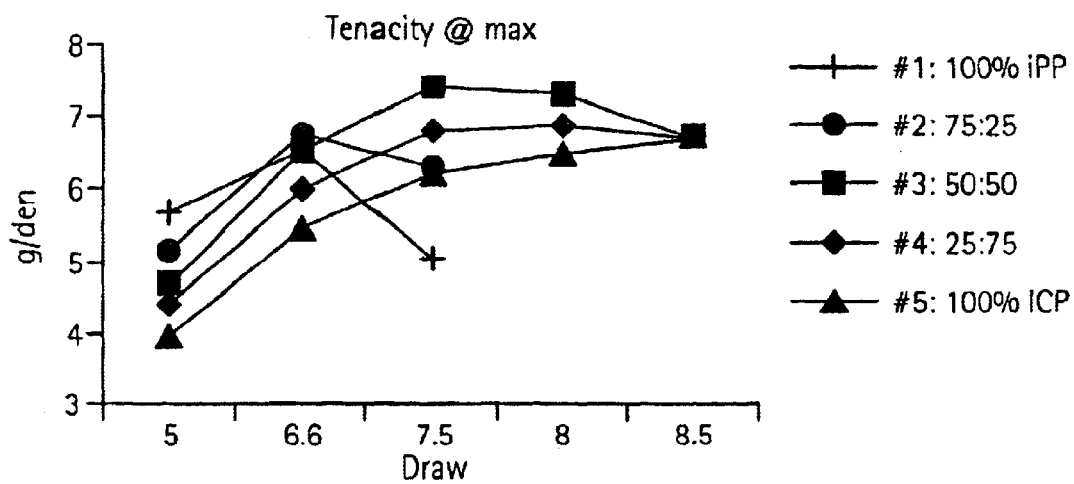
FIG. 4 is a plot showing tenacities of slit film tapes prepared using various polymer blends and at different draw ratios.

FIG. 4 shows that the slit film tapes made from the 50:50 ICP:iPP blend had the highest tenacity at a draw ratio of 7.5. This was a 14% higher tenacity than slit film tapes made from the homopolymer control at its optimum draw ratio of 6.6. Homopolymer slit film tape tenacity peaked early and dropped sharply compared to slit film tapes with high levels of ICP.

Figure 5:
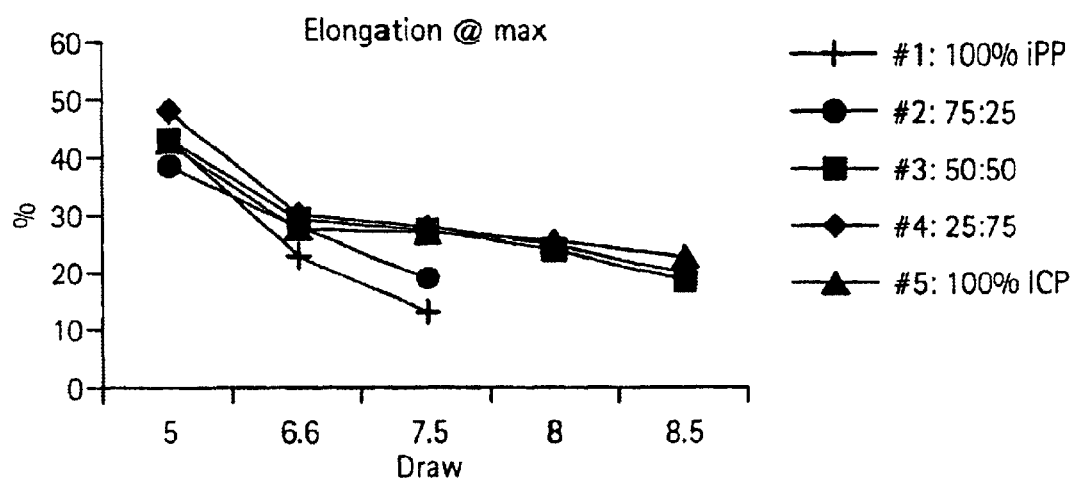
FIG. 5 is a plot showing elongation of slit film tapes prepared using various polymer blends and at different draw ratios.

As shown in FIG. 5, as the percentage of ICP in the slit film tapes was increased, the tapes could be drawn to a high degree. The ICP slit film tapes maintained elongation better as the draw ratio was increased. At optimum draw ratios of 7.5 and 6.6 respectively, slit film tapes made from the 50:50 blend had 20% higher elongation than slit film tapes made from the homopolymer control.

Figure 6:
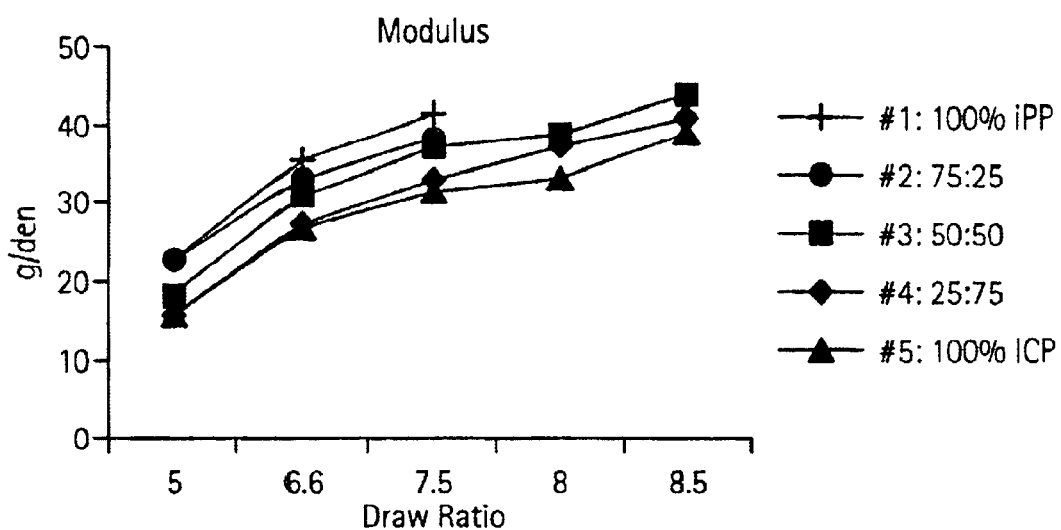
FIG. 6 is a plot showing tensile moduli of slit film tapes prepared using various polymer blends and at different draw ratios.

Slit film tapes made from the ICP blends were generally less stiff than the slit film tapes made from the polypropylene homopolymer, as indicated by the tensile moduli of the drawn tapes set forth in FIG. 6. Tensile moduli were determined at 5% elongation. The tapes also had reduced tape tension and draw breaks with increased ICP content, as presented in Table 4.

It was also noted that films and tapes made from the iPP homopolymer exhibited a typical shiny appearance, whereas a dull matte appearance was noted on the ICP blend samples, with the matte appearance increasing as the percentage of ICP increased.

Figure 7:
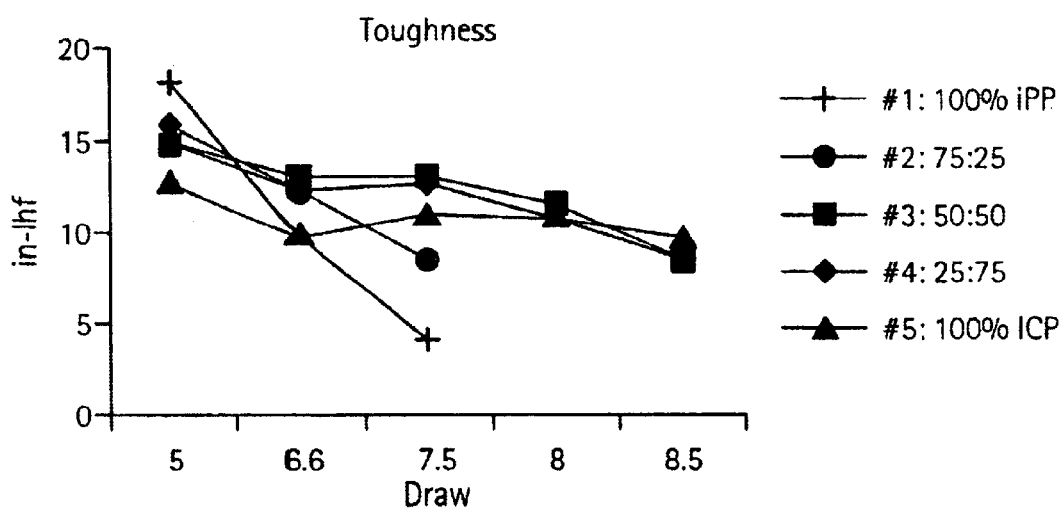
FIG. 7 is a plot showing toughness of slit film tapes prepared using various polymer blends and at different draw ratios.

FIG. 7 shows that adding ICP results in tougher slit film tapes. Homopolymer slit film tape toughness drops as the draw ratio increases, but the blends maintained better toughness at high draw ratios. At their respective optimum draw ratios, slit film tapes made from the 50:50 blend (DR=7.5) was 31% tougher than the slit film tapes made from the homopolymer control (DR=6.6).

EXAMPLE 2

Impact copolymer-homopolymer blends were used in forming fabric materials using varying amounts of ICP and iPP. The ICP material used was ATOFINA 4320. The iPP homopolymer used was ATOFINA 3367V. Both were prepared from Ziegler-Natta catalysts. The ATOFINA 4320 used had a room temperature (23° C.) notched IZOD impact strength of approximately 4.2 ft-lb$_f$/in. The polymers further had the following properties, as set forth in Table 5 below.

TABLE 5

Resin Characteristics

| Resin | MFR (g/10 min) | Overall* Wt. % $C_2$= | EPR* phase Wt. % $C_2$= |
|---|---|---|---|
| iPP | 2.8 | 0 | 0 |
| ICP | 3.7 | 9.5 | 44.7 |

*$C_2$ content as measured by carbon NMR.

The fabric materials produced utilizing the ICP/iPP blends had dramatically improved strength properties over that produced with no ICP.

EXAMPLE 3

Slit tapes were prepared from both an impact copolymer-homopolymer blend and an iPP homopolymer to evaluate surface roughness without delustering. The tapes were prepared using a draw ratio of 6:1. The polymer blend was formed from a 50:50 ICP:iPP blend of ATOFINA 4320, as the ICP, and ATOFINA 3462 as the iPP. This was compared to ATOFINA 3462 as a homopolymer. Surface properties of the tapes were measured Nanoscope atomic force microscopy (AFM) tapping mode. The following results were obtained, as presented in Table 6 below.

TABLE 6

| | Homopolymer | | | ICP:iPP Blend | | |
|---|---|---|---|---|---|---|
| Run | Z-Range | Ra (nm) | Rms (nm) | Z-Range | Ra (nm) | Rms (nm) |
| 1 | 562.08 | 52.917 | 63.884 | 1347 | 106.57 | 134.58 |
| 2 | 818.35 | 62.11 | 79.199 | 1230 | 137.33 | 169.39 |
| 3 | 673.91 | 65.332 | 79.619 | 1526 | 117.72 | 154.08 |
| 4 | 609.2 | 56.833 | 73.108 | 1138 | 97.774 | 123.7 |
| 5 | 919.08 | 55.33 | 71.066 | 1084 | 111.88 | 140.38 |
| 6 | 593.84 | 61.887 | 80.971 | 1266 | 117.85 | 151.39 |
| Avg. | 696.1 | 59.1 | 74.6 | 1265.2 | 114.9 | 145.6 |

The slit film tapes can be used in a variety of products that require a high degree of durability and toughness. The slit film tapes can be woven or otherwise intertwined or interlaced together or with other natural or man-made fibers to form a variety of different woven materials, fabrics and other textiles.

One of the primary uses of slit film tapes is in carpet manufacturing. The slit film tapes can be used in both primary and secondary carpet backing for carpet construction. In a typical carpet construction, the slit film tapes are used to form a primary backing material in which the slit film tapes are woven together. Face carpet fibers or yarn are then tufted through this primary backing material. A secondary layer of backing material is also formed from slit film tapes, which may be interlaced or combined with other fibers. The secondary layer of backing material is positioned against the undersurface of the primary backing opposite the face fibers and is usually joined thereto by a layer of adhesive sandwiched therebetween.

The slit film tapes can be formed, such as by weaving, twisting, interlacing or otherwise combined, into a variety of other items, in addition to carpet backing. These include such things as industrial bags, sacks and wraps, ropes, netting and cordage, artificial grass or turf and geotextiles. The blend of polypropylene impact copolymers and propylene homopolymers can also be used for other materials where improved drawability, higher tenacity, higher elongation, and increased toughness are desired.

The polypropylene material of the invention can be used in strapping for binding or securing cargo and the like, and where high tenacity and better strength and toughness are important. Strapping is manufactured in much the same way as slit film tapes. The blended heterophasic copolymer and polypropylene homopolymer are extruded into a sheet and quenched on chill rollers, water bath or combination thereof. The sheet is then slit longitudinally into segments or lengths of strapping and drawn in the longitudinal or machine direction. The draw ratios used are similar to those used for slit film tape. The strapping material may also be flame or otherwise surface treated. Strapping is thicker than the slit film tape and typically has a thickness of from about 3 mils to about 12 mils, with from about 5 to about 10 mils being more typical, and may have a width of from about 0.25 inches to about 1 inch.

The polypropylene material of the invention can also be formed into in mono-oriented or tensilized film. Such films are formed by extruding or casting a sheet or film and quenching the film or sheet on a chill roller, water bath or combination thereof. The sheet or film is then drawn or stretched in the longitudinal or machine direction on one or more rollers, which may be heated. Such oriented films usually are drawn at draw ratios and have thicknesses similar to the slit film tapes previously discussed. The tensilized film may be surface treated, coated with adhesives and/or release agents. The film can then be slit longitudinally into more usable widths or segments. Such materials may include tape used in packaging or box sealing tapes and similar materials.

Because of the heterophasic copolymer component, the tapes and materials formed also can exhibit increased adhesion for certain substrates that are applied thereon. This is in contrast to those materials prepared from polypropylene homopolymers. The inclusion of the heterophasic copolymer tends to disrupt the surface morphology of the material to provide better adherence when inks, adhesives, etc. are applied thereon. This allows a reduction or even elimination of various additives, such as maleic anhydride, or other treatments that are often used to increase surface adhesion of such materials.

Slit film tapes and other similar materials prepared from a blend of polypropylene impact copolymers and propylene homopolymers exhibit better drawability, higher tenacity, higher elongation, and better toughness. These properties are useful in producing durable products from and enhance the processability of the materials and the manufacturing of articles and items made from such materials. Lighter weight or down gauged fabrics or other materials can also be produced from the polypropylene materials of the invention while still maintaining strength, durability and toughness. The tapes or films also exhibit a matte appearance or finish, which eliminates the need for delustering, through mechanical means or otherwise, which may be desirable.

While the invention has been shown in only some of its forms, it should be apparent to those skilled in the art that it is not so limited, but is susceptible to various changes and modifications without departing from the scope of the invention. Accordingly, it is appropriate that the appended claims be construed broadly and in a manner consistent with the scope of the invention.

We claim:

1. A polypropylene material compromise a film or sheet of a melt blended heterophasic propylene copolymer and an isotactic propylene homopolymer wherein the heterophasic propylene copolymer has an ethylene content of from about 5% to about 20% by weight of copolymer and is present in an amount of greater than 40% to about 75% by weight of polymer blend.

2. The polypropylene material of claim 1, wherein the heterophasic propylene copolymer has an ethylene-propylene rubber phase in the amount of from about 5% to about 50% by weight of copolymer.

3. The polypropylene material of claim 1, wherein the film or sheet is oriented in one direction.

4. The polypropylene material of claim 1, wherein the film or sheet is a length of tape.

5. The polypropylene material of claim 4, wherein the tape has an elongation at maximum load of at least 15% at a draw ratio of 7.5:1.

6. The polypropylene material of claim 4, wherein the tape has a toughness of greater than 5 in-lbf.

7. A length of tape formed from the polypropylene material of claim 1, and further comprising a layer of adhesive joined to at least one side the length of tape.

8. The polypropylene material of claim 1, wherein the film or sheet is a length of strapping.

9. The polypropylene material of claim 1, wherein the film or sheet is drawn to a draw ratio of from about 3:1 to about 10:1.

10. The polypropylene material of claim 1, wherein the film or sheet exhibits a surface Rms that is at least about 50% greater than that of the isotactic propylene homopolymer prepared under the same conditions.

11. A polypropylene material comprising a film or sheet of a melt blended heterophasic propylene copolymer and an isotactic propylene homopolymer, the heterophasic propylene copolymer has an ethylene content of from about 5% to about 20% by weight of copolymer and is present in an amount of from greater than 40% to about 75% by total weight of polymer blend and having an ethylene-propylene rubber phase in an amount of at least 5% by weight of copolymer.

12. A polypropylene tape comprising a melt blended heterophasic propylene copolymer and an isotactic propylene homopolymer wherein the heterophasic propylene copolymer has an ethylene content of from about 5% to about 20% by weight of copolymer and is present in an amount of greater than 40% to about 75% by weight of polymer blend.

13. The polypropylene tape of claim 12, wherein the heterophasic propylene copolymer has an ethylene-propylene rubber phase in the amount of from about 5% by weight of copolymer.

14. The polypropylene tape of claim 12, wherein the length of tape is drawn to a draw ratio of from about 3:1 to about 10:1.

15. The polypropylene tape of claim 12, wherein the length of tape has a tenacity at maximum load of at least 5 g/den at a draw ratio of 7.5:1.

16. The polypropylene tape of claim 12, wherein the length of tape has an elongation at maximum load of at least 15% at a draw ratio of 7.5:1.

17. The polypropylene tape of claim 12, wherein the length of tape has a tenacity at maximum load at a draw ratio of 7.5:1 that is at least 10% greater than tape prepared solely from the isotactic polypropylene.

18. The polypropylene tape film of claim 12, wherein the length of tape has an elongation at maximum load at a draw ratio of 7.5:1 that is at least 10% greater than tape prepared solely from the isotactic polypropylene.

19. The polypropylene tape of claim 12, wherein the length of the tape has a toughness of greater than 5 in-lbf.

20. The polypropylene tape of claim 12, wherein the tape exhibits a surface Rms that is at least about 50% greater than that of the isotactic propylene homopolymer.

21. A polypropylene tape comprising a melt blended heterophasic propylene copolymer and an isotactic propylene homopolymer, the heterophasic propylene copolymer has an ethylene content of from about 5% to about 20% by weight of copolymer and is present in an amount of greater than 40% to about 75% by total weight of polymer blend and having an ethylene-propylene rubber phase in an amount of from about 5% by weight of copolymer.

22. An article prepared using a polypropylene material comprising a melt blended heterophasic propylene copolymer and an isotactic propylene homopolymer wherein the heterophasic propylene copolymer has an ethylene content of from about 5% to about 20% by weight of copolymer and is present in an amount of greater than 40% to about 75% by weight of polymer blend, wherein the article is selected from a group consisting of carpet backing, a bag, a sack, wrapping, rope, cordage, artificial grass or turf; a geotextile material, netting, a layer of fabric, an industrial packaging fabric, tape, strapping, packaging tape, and box sealing tape.

23. A method of forming a polypropylene material comprising:
providing a heterophasic propylene copolymer and an isotactic propylene homopolymer wherein the heterophasic propylene copolymer has an ethylene content of from about 5% to about 20% by weight of copolymer and is present in an amount of greater than 40% to about 75% by weight; blending the copolymer and homopolymer together; and extruding the blend of polymers into a sheet or layer of film.

* * * * *